US007228796B2

(12) United States Patent
Neto

(10) Patent No.: US 7,228,796 B2
(45) Date of Patent: *Jun. 12, 2007

(54) FRUIT JUICE EXTRACTION APPARATUS AND SUBCOMBINATION THEREOF, COMPRISING PERFORATING FILTERING TUBE AND PISTON

(76) Inventor: Carlos Mendes Neto, Rua Voluntarlos de Patria 1766-apt. 101, CEP 14801-320, Araraquara, SP (BR)

( * ) Notice: Subject to any disclaimer, the term of this patent is extended or adjusted under 35 U.S.C. 154(b) by 0 days.

This patent is subject to a terminal disclaimer.

(21) Appl. No.: 11/431,469

(22) Filed: May 10, 2006

(65) Prior Publication Data
US 2006/0201345 A1    Sep. 14, 2006

Related U.S. Application Data

(63) Continuation of application No. 09/028,187, filed on Feb. 23, 1998, now Pat. No. 7,086,328, which is a continuation-in-part of application No. 08/884,529, filed on Jun. 27, 1997, now abandoned, which is a continuation-in-part of application No. 08/763,679, filed on Dec. 11, 1996, now abandoned, and a continuation-in-part of application No. 08/759,727, filed on Dec. 6, 1996, now abandoned, and a continuation-in-part of application No. 08/759,722, filed on Dec. 6, 1996, now Pat. No. 5,720,219, and a continuation-in-part of application No. 08/759,723, filed on Dec. 6, 1996, now abandoned, and a continuation-in-part of application No. 08/759,724, filed on Dec. 6, 1996, now abandoned, and a continuation-in-part of application No. 08/681,622, filed on Jul. 29, 1996, now abandoned, and a continuation-in-part of application No. 08/681,623, filed on Jul. 29, 1996, now abandoned, and a continuation-in-part of application No. 08/681,624, filed on Jul. 29, 1996, now abandoned, and a continuation-in-part of application No. 08/681, 625, filed on Jul. 29, 1996, now abandoned, and a continuation-in-part of application No. 08/681,626, filed on Jul. 29, 1996, now Pat. No. 5,802,964, and a continuation-in-part of application No. 08/681,658, filed on Jul. 29, 1996, now abandoned, and a continuation-in-part of application No. 08/681,627, filed on Jul. 29, 1996, now Pat. No. 5,720,218, and a continuation-in-part of application No. 08/681,628, filed on Jul. 29, 1996, now abandoned, and a continuation-in-part of application No. 08/647,066, filed on May 9, 1996, now Pat. No. 5,655,441.

(30) Foreign Application Priority Data

| Jun. 19, 1995 | (BR) | ................... 9502244 |
|---|---|---|
| Aug. 1, 1995 | (BR) | ................... 5501197 |
| Aug. 1, 1995 | (BR) | ................... 5501198 |
| Aug. 1, 1995 | (BR) | ................... 5501199 |
| Aug. 1, 1995 | (BR) | ................... 7501779 U |
| Aug. 1, 1995 | (BR) | ................... 7501780 U |
| Aug. 1, 1995 | (BR) | ................... 7501781 U |
| Aug. 1, 1995 | (BR) | ................... 9503518 |
| Aug. 7, 1995 | (BR) | ................... 5501053 |
| Aug. 7, 1995 | (BR) | ................... 7501563 U |
| Aug. 7, 1995 | (BR) | ................... 9503109 |
| Dec. 8, 1995 | (BR) | ................... 5501976 |
| Dec. 8, 1995 | (BR) | ................... 7502784 U |
| Dec. 8, 1995 | (BR) | ................... 7502785 U |
| Dec. 8, 1995 | (BR) | ................... 7502786 U |
| Dec. 15, 1995 | (BR) | ................... 7502994 U |

(51) Int. Cl.
*B30B 9/04* (2006.01)

(52) U.S. Cl. ................... 100/98 R; 100/108; 100/116; 100/130; 100/213; 99/495; 99/509

(58) Field of Classification Search ............. 100/98 R, 100/107, 108, 116, 130, 134, 135, 213; 99/486, 99/489, 493, 495, 509–513
See application file for complete search history.

(56) References Cited

U.S. PATENT DOCUMENTS

| 1,514,094 A | 11/1924 | Noble |
|---|---|---|
| 2,116,325 A | 5/1938 | Rogers |
| 2,332,177 A | 10/1943 | Smith |
| 2,346,571 A | 4/1944 | Delay |

| | | |
|---|---|---|
| 2,419,545 A | 4/1947 | Gray et al. |
| 2,420,679 A | 5/1947 | Pipkin |
| 2,420,681 A | 5/1947 | Peterson |
| 2,463,125 A | 3/1949 | Smith et al. |
| 2,522,800 A | 9/1950 | Quiroz |
| 2,534,554 A | 12/1950 | Kahre |
| 2,540,345 A | 2/1951 | Pipkin |
| 2,649,730 A | 8/1953 | Hait |
| 2,649,731 A | 8/1953 | Polk, Sr. et al. |
| 2,659,298 A | 11/1953 | Hudson |
| 2,713,434 A | 7/1955 | Belk |
| 2,723,618 A | 11/1955 | Matthews |
| 2,748,693 A | 6/1956 | Drain et al. |
| 2,780,988 A | 2/1957 | Belk et al. |
| 2,846,943 A | 8/1958 | Belk |
| 2,856,846 A | 10/1958 | Belk |
| 3,053,170 A | 9/1962 | Cook |
| 3,086,455 A | 4/1963 | Belk |
| 3,162,114 A | 12/1964 | Quiroz |
| 3,236,175 A | 2/1966 | Belk |
| 3,269,301 A | 8/1966 | Krause |
| 3,429,257 A | 2/1969 | Belk |
| 3,682,092 A | 8/1972 | Breton et al. |
| 3,736,865 A | 6/1973 | Hait |
| 3,866,528 A | 2/1975 | Montagroni |
| 4,154,163 A | 5/1979 | Niemann |
| 4,300,449 A | 11/1981 | Segredo |
| 4,376,409 A | 3/1983 | Belk |
| 4,391,185 A | 7/1983 | Stanley |
| 4,459,906 A | 7/1984 | Cound et al. |
| 4,700,620 A | 10/1987 | Cross |
| 4,905,586 A | 3/1990 | Anderson et al. |
| 4,917,007 A | 4/1990 | Nelson |
| 4,922,813 A | 5/1990 | Compri |
| 4,922,814 A | 5/1990 | Anderson et al. |
| 4,951,563 A | 8/1990 | Warren et al. |
| 4,961,374 A | 10/1990 | Lee |
| 5,035,174 A | 7/1991 | Seal, Jr. |
| 5,070,778 A | 12/1991 | Cross et al. |
| 5,097,757 A | 3/1992 | Antonio |
| 5,156,872 A | 10/1992 | Lee |
| 5,170,700 A | 12/1992 | Anderson et al. |
| 5,182,984 A | 2/1993 | Wagner |
| 5,199,348 A | 4/1993 | Cimenti |
| 5,249,514 A | 10/1993 | Otto et al. |
| 5,331,887 A | 7/1994 | Beck |
| 5,339,729 A | 8/1994 | Anderson |
| 5,381,730 A | 1/1995 | Kim |
| 5,396,836 A | 3/1995 | Kim |
| 5,483,870 A | 1/1996 | Anderson et al. |
| 5,655,441 A | 8/1997 | Mendes |
| 5,720,218 A * | 2/1998 | Mendes .................. 99/509 |
| 7,086,328 B1 * | 8/2006 | Mendes .................. 100/98 R |

FOREIGN PATENT DOCUMENTS

| | | |
|---|---|---|
| EP | 0442535 A1 | 8/1991 |
| EP | 0757896 A1 | 2/1997 |
| GB | A-753988 | 8/1956 |
| GB | 2 116 021 A | 9/1983 |

* cited by examiner

*Primary Examiner*—Lowell A. Larson
*Assistant Examiner*—Jimmy Nguyen
(74) *Attorney, Agent, or Firm*—Joseph Fischer; David G. Maier; Beusee Wolter Sanks Mora & Maier, P.A.

(57) ABSTRACT

Embodiments of subcombination and the fruit extraction device of the present invention provide for fruit juice extraction where synchronized and concentric elements press a fruit, such as an orange, without crushing the peel, by this avoiding the dispersion of acids from the peel, favoring the retention of juice having lower acid levels. Embodiments of the subcombination and the fruit extraction device of which it is a portion shear the peel in multiple slivers, at the same time compressing the fruit. In an exemplary embodiment, a subcombination comprises a fixed and a mobile peeler, each having radially extending blades that form a space within which a fruit may be positioned for juice extraction, and a perforating filtering tube within the fixed peeler, and a piston adapted to pass through the lumen of the perforating filtering tube to cyclically clean it of the residues of a compressed fruit prior to extraction of the next fruit.

53 Claims, 13 Drawing Sheets

FRUIT JUICE EXTRACTION APPARATUS AND SUBCOMBINATION THEREOF, COMPRISING PERFORATING FILTERING TUBE AND PISTON

CROSS-REFERENCES TO RELATED APPLICATIONS

This application is a continuation of U.S. patent application Ser. No. 09/028,187 filed Feb. 23, 1998, now U.S. Pat. No. 7,086,328, which is a continuation-in-part of U.S. patent application Ser. No. 08/884,529 filed Jun. 27, 1997 (now abandoned). U.S. patent application Ser. No. 08/884,529 is a continuation-in-part of U.S. patent application Ser. No. 08/763,679 filed Dec. 11, 1996 (now abandoned), and also is a continuation-in-part of U.S. patent application Ser. No. 08/759,727 filed Dec. 6, 1996 (now abandoned), and also is a continuation-in-part of U.S. patent application Ser. No. 08/759,722 filed Dec. 6, 1996 (now U.S. Pat. No. 5,720,219), and also is a continuation-in-part of U.S. patent application Ser. No. 08/759,723 filed Dec. 6, 1996 (now abandoned), and also is a continuation-in-part of U.S. patent application Ser. No. 08/759,724 filed Dec. 6, 1996 (now abandoned), and also is a continuation-in-part of U.S. patent application Ser. No. 08/681,622 filed Jul. 29, 1996 (now abandoned), and also is a continuation-in-part of U.S. patent application Ser. No. 08/681,623 filed Jul. 29, 1996 (now abandoned), and also is a continuation-in-part of U.S. patent application Ser. No. 08/681,624 filed Jul. 29, 1996, (now abandoned) and also is a continuation-in-part of U.S. patent application Ser. No. 08/681,625 filed Jul. 29, 1996 (now abandoned), and also is a continuation-in-part of U.S. patent application Ser. No. 08/681,626 filed Jul. 29, 1996 (now U.S. Pat. No. 5,802,964), and also is a continuation-in-part of U.S. patent application Ser. No. 08/681,658 filed Jul. 29, 1996 (now abandoned), and also is a continuation-in-part of U.S. patent application Ser. No. 08/681,627 filed Jul. 29, 1996 (now U.S. Pat. No. 5,720,218), and also is a continuation-in-part of U.S. patent application Ser. No. 08/681,628 filed Jul. 29, 1996 (now abandoned), and also is a continuation-in-part of U.S. patent application Ser. No. 08/647,066 filed May 9, 1996 (now U.S. Pat. No. 5,655,441).

Respective claims to priority to corresponding patent applications earlier filed in Brazil are also made, as is indicated in the Declaration/Power of Attorney provided herewith.

The specification incorporates selected text from U.S. patent application Ser. No. 09/028,187 filed Feb. 2, 1998 (pending), U.S. patent application Ser. No. 08/681,622 filed Jul. 29, 1996 (now abandoned), U.S. patent application Ser. No. 08/681,627 filed Jul. 29, 1996 (now U.S. Pat. No. 5,720,218) and from U.S. patent application Ser. No. 08/763,679 filed Dec. 11, 1996 (now abandoned). Figures also are provided from these four patent applications. However, the entirety of all of the applications of the first paragraph above are incorporated herein by reference as if set forth in full below.

BACKGROUND

Equipment that crush all of the fruit in the extraction of juice have an elementary disadvantage that is the dispersion of the acids in the peel, leaving the juice with a bitter taste, not fit for consumption.

It is worth noting that to resolve these problems, several types of machinery and equipment for the extraction of juice have appeared, incorporating important shortcomings that are important to be analyzed, such as currently it is known of a machine for processing citrus fruit, especially oranges, where there is a system which after the insertion of the fruit, it is cut in half, and the halves are separated in two rotating cylinders in which two geared reamers, also rotating and hemispherical in shape, crush the fruit halves extracting the juice.

Nevertheless, this system, because of its characteristics, exposes the extracted juice to the peel, in such a manner that the juice bathes, partially or totally, the peel, provoking an emulsification of the oil contained in the peel, incorporating it in the juice, making it acidic and bitter.

It is worth noting that in laboratory tests, it is observed that the level of peel oil in the juice, with this system, varies from 50 to 500% above the norm tolerable for consumption.

There are also other known equipment that function in distinctly different manners than the one previously cited, encompassing voluminous and heavy mechanical systems that provoke the crushing of the whole fruit.

The existing mechanical systems consist of actuated arms that compress the fruit between two concentric peelers. Said concentric peelers are built with multiple radial openings that interlink with each other (one cupping the other). Nevertheless, the design of the openings makes it such that the fruit becomes crushed and not cut, resulting in the liberation of peel oil into the juice.

As a result of the large space occupied by the machines, the space for fruit storage becomes very limited, forcing the operator to feed the machine constantly.

Systems taught in FMC Corporation's U.S. Pat. No. 5,070,778, U.S. Pat. No. 5,170,700, U.S. Pat. No. 5,339,729 and, U.S. Pat. No. 5,483,870, produce oil in the juice and the vertical cores have a tendency to jam with the fruit.

In analyzing these inconveniences, the applicant, who is active in this segment of the market, has developed the apparatus herein claimed, as a definitive solution to these inconveniences.

BRIEF DESCRIPTION OF THE FIGURES

FIGS. 14 and 16 illustrate cut B—B and cut A—A of FIG. 13.

DETAILED DESCRIPTION OF EMBODIMENTS OF THE INVENTION

The apparatus of the present invention consists of an automatic system where synchronized and concentric elements press the orange (this fruit will be used only as an example), without crushing the peel, by this avoiding the dispersion of acids (from the peel), favoring the retention of totally natural juice. The system does not crush the peel and does shear it in multiple slivers, at the same time it compresses the fruit, a factor that impedes the release of oil in the peel.

Figure 1:
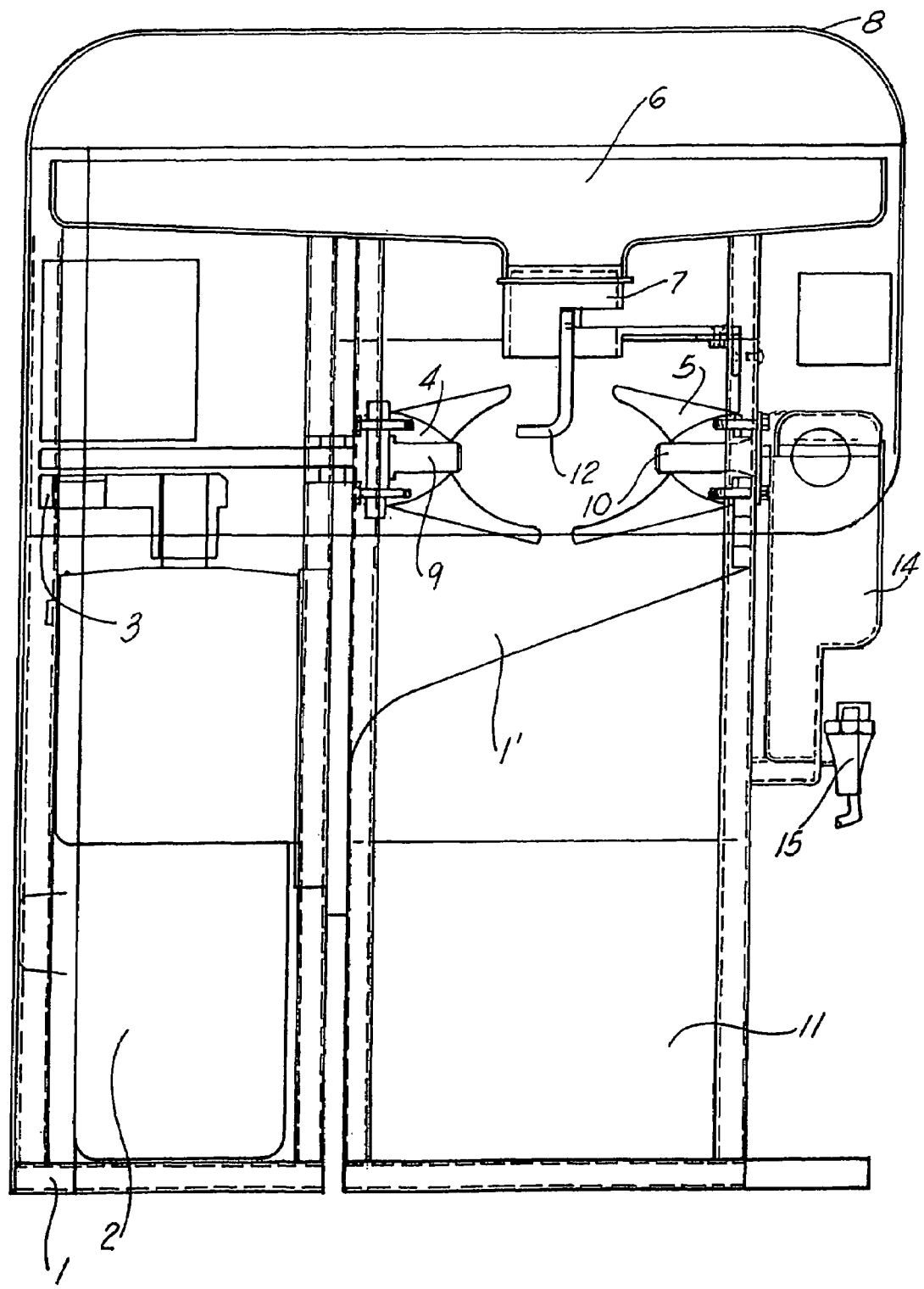
FIG. 1 is a side elevational view, partially in cross-section, of an embodiment of the apparatus of the present invention.
Figure 2:
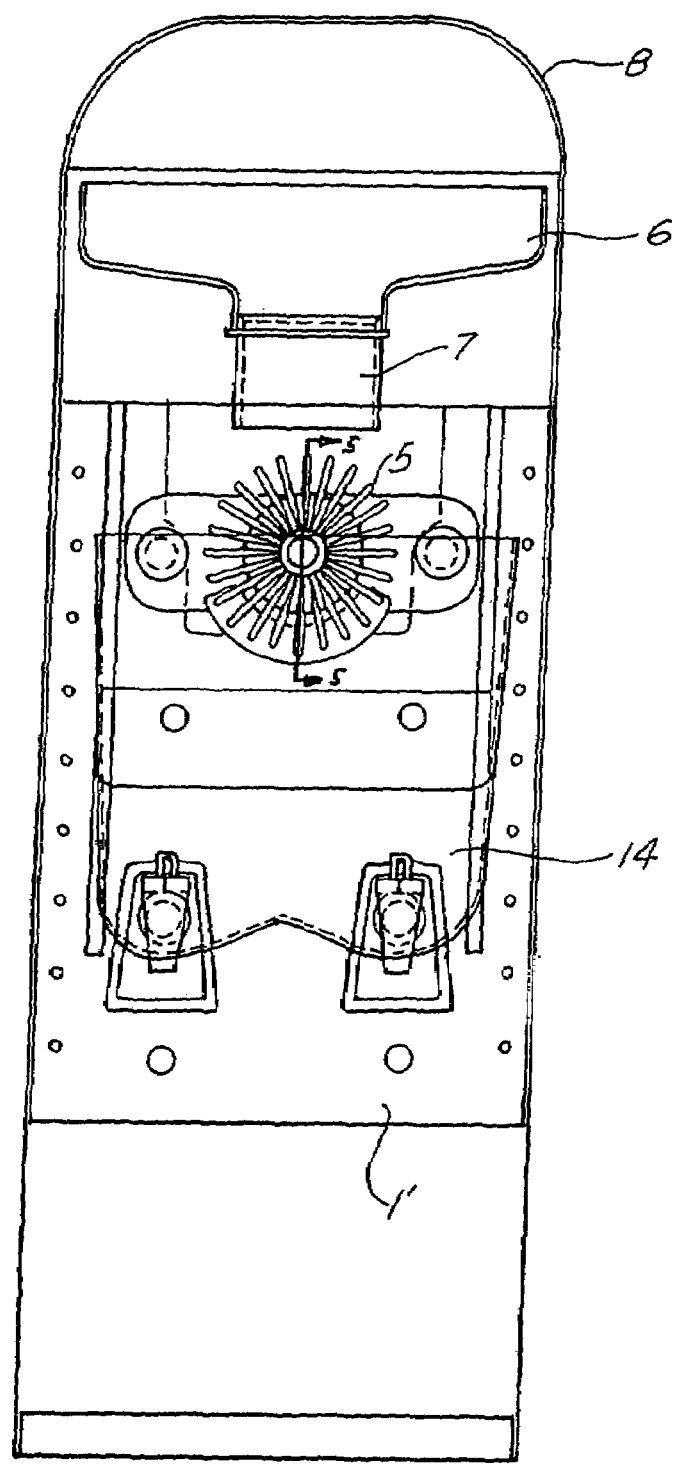
FIG. 2 is front elevational view, partially in cross-section, of the embodiment of FIG. 1.
Figure 3:
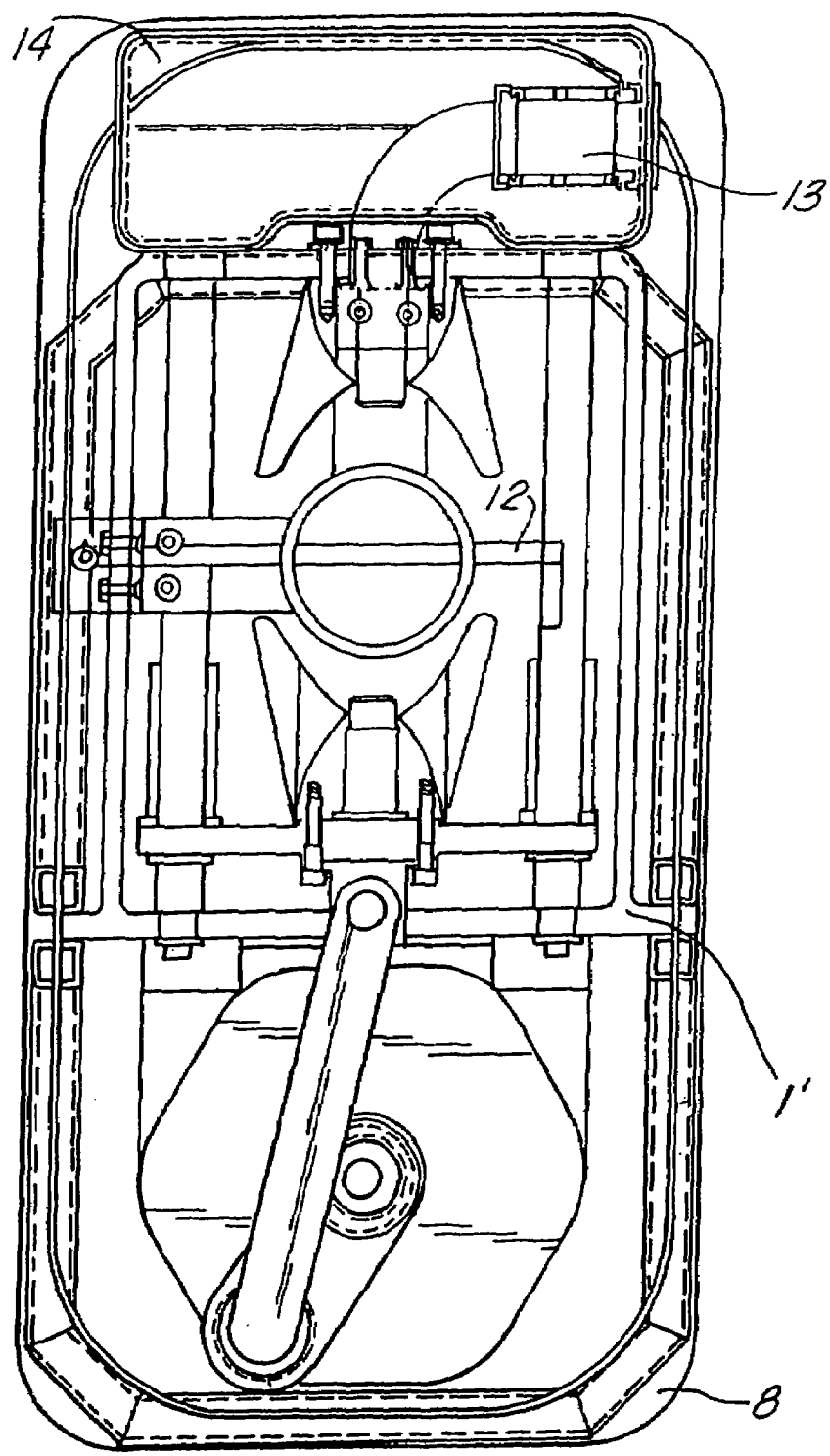
FIG. 3 is a top plan view, partially in cross-section, of the embodiment of FIG. 1.

One apparatus embodiment of the present invention, in accordance with FIGS. 1–3, comprises a tubular chassis 1, affixed to an extraction box 1' for housing juice, mounted vertically on this box 1' is a gearmotor 2 which drives a crank and rod 3 which provokes the axial movement of one of the concave and radially cut hemispheres 4 against the other concave and radially cut hemisphere 5, both radially interfacing.

On the upper part of the apparatus is provided a tray 6 with an opening 7 through which the fruit is driven to fall in between the concave hemispheres 4, 5, all shielded by a protective cover 8 over the entire assembly.

The concave hemisphere 4 has a concentric central pin 9 and the concave hemisphere 5 has a perforating tube 10 through which the juice is extracted. The fruit peel and core fall into receptacle 11.

The concave hemisphere 4 drives a trigger 12 during its motion feeding one fruit at a time; the juice coming from the tube 10 passes through a filter 13 and is retained in a reservoir 14 which is equipped with faucets or outlet ports 15 for dispensing.

Incidental residues, such as core and seeds do not pass through the filter 13 and are ejected through the tube 10 toward the receptacle 11.

As is disclosed in U.S. patent application Ser. No. 08/681,627, filed Jul. 29, 1996 by the same inventor (now U.S. Pat. No. 5,720,218), which per the above is incorporated by reference herein, the apparatus makes a series of radial cuts on the fruit followed by a pressing, cuts made by shearing of the peel thanks to the configuration of the radially cut and concave hemispheres. As viewable in FIGS. 4 and 5, each concave and radially cut hemisphere 4, 5 consists of a body 21 of aluminum, stainless steel, or other materials resistant to oxidation and suited for this end, having a divergent opening 29 formed by radial blades 23, 25.

Figure 4:
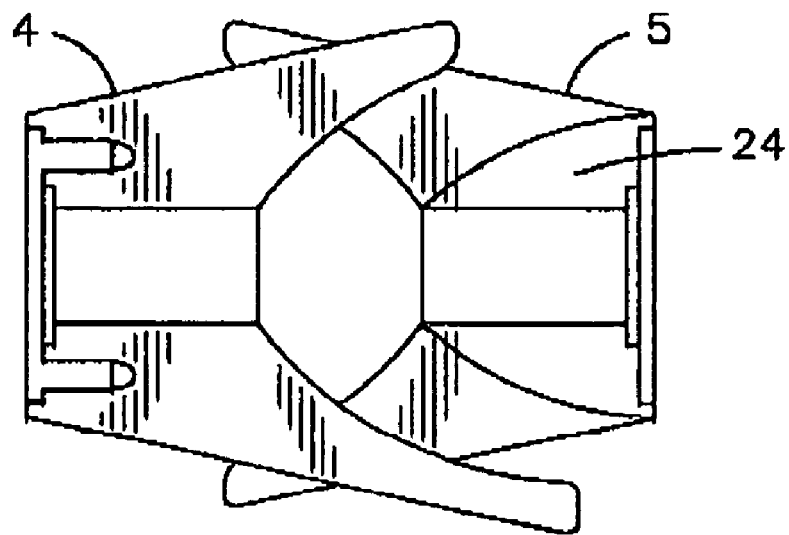
FIG. 4 shows a cross-sectional view of the two radially cut and concave hemispheres in the operating position.
Figure 5:
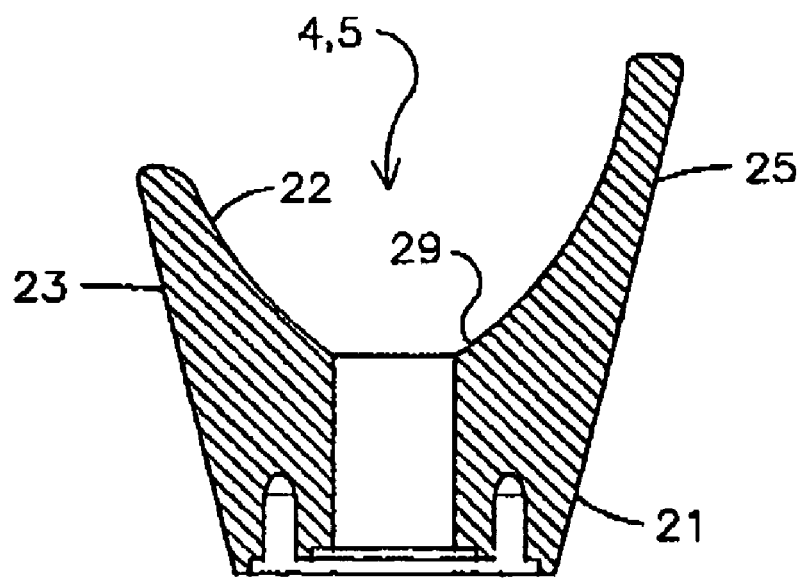
FIG. 5 illustrates a cross-sectional view of cut 5—5 of FIG. 2 (and also represents a cross-sectional view of FIG. 13, cut A—A.

The internal part 22 is of a concave shape, best seen in FIGS. 4 and 5, the body 21 being configured by a multiplicity of radial blades 23 that emerge from a solid block or base 24. The longer blades 25 mesh with the other or shorter blades 23 of normal size, in a manner as to serve as support of the fruit.

It is worth noting that there does not exist any electromechanical device for the driving of the said assembly, which consists basically of the perforating filter and a piston concentric to same, which promotes the internal scraping of the perforating filter in order to clean it. It is noted that the component depicted in detail in FIGS. 10A, B and 11A,B is variously referred to herein as "perforating filtering tube," "perforating filter," and "perforating tube."

Such device is totally unknown by the state of the technology and its installation guarantees a relevant increase in the productivity of the assembly.

Figure 6:
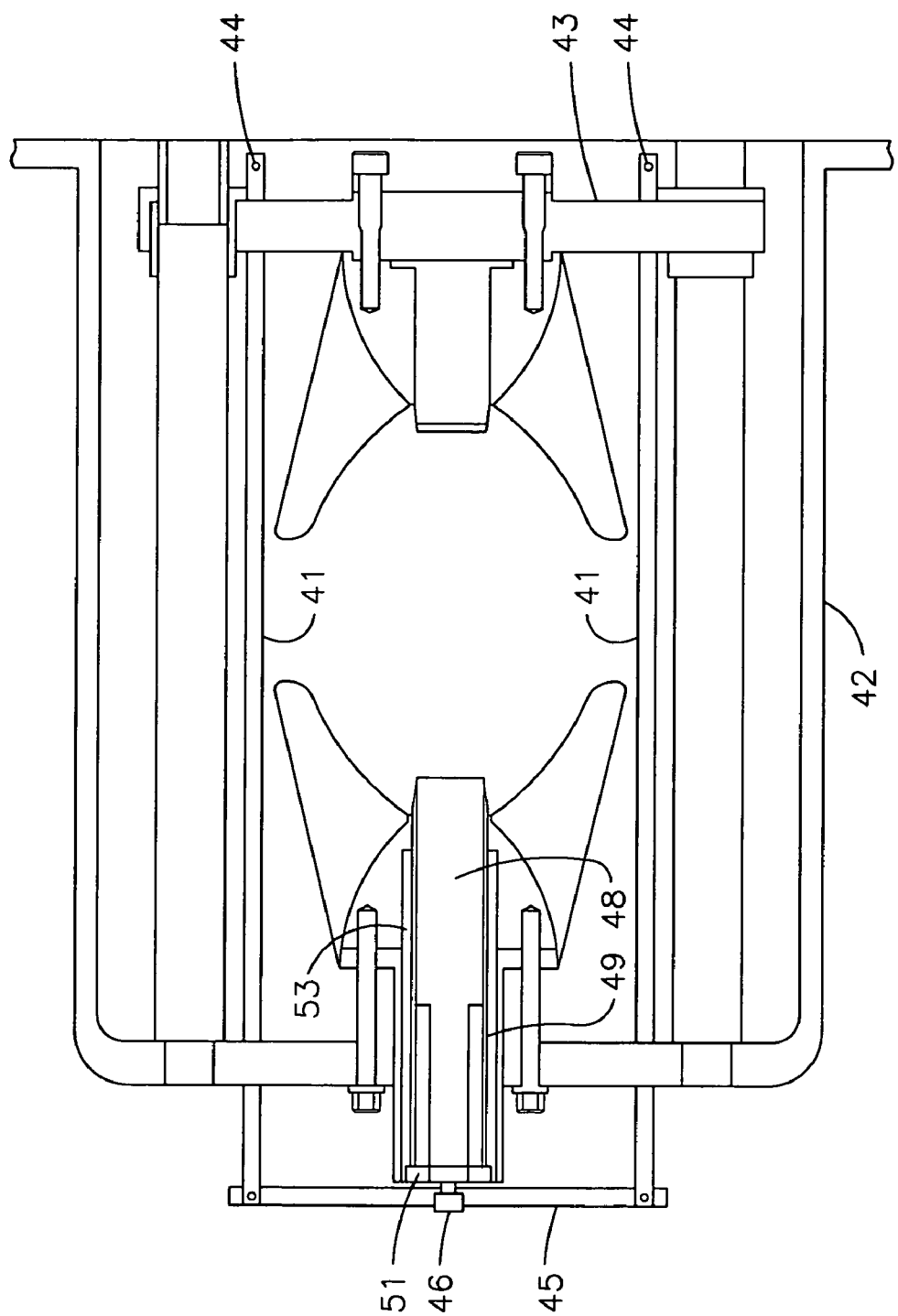
FIG. 6 illustrates the top with partial cut-away view detailing the device in question together with the cutting, pressing and juice extraction mechanism.

To better elucidate the model, references will be made to the following included drawings, where:

FIG. 6 illustrates the top view detailing the device in question together with the cutting, pressing and juice extraction mechanism.

Figure 7A:
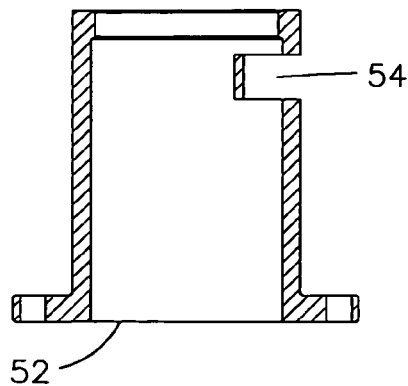
FIGS. 7A and 7B illustrate, respectively, a cross-sectional side view and a top view of the juice collector.
Figure 7B:
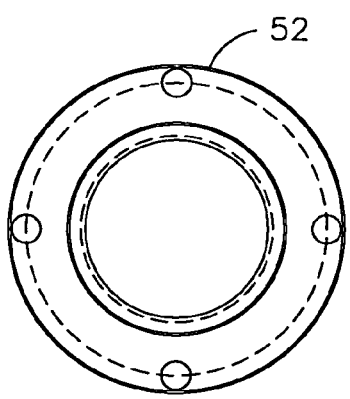

FIGS. 7A and 7B illustrate, respectively, a cross-sectional side view and a top view of the juice collector.

Figure 8A:
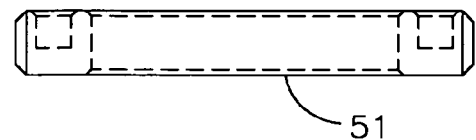
FIGS. 8A and 8B illustrate, respectively, on a larger scale a cross-sectional side view and a bottom view of the support of the perforating filter.
Figure 8B:
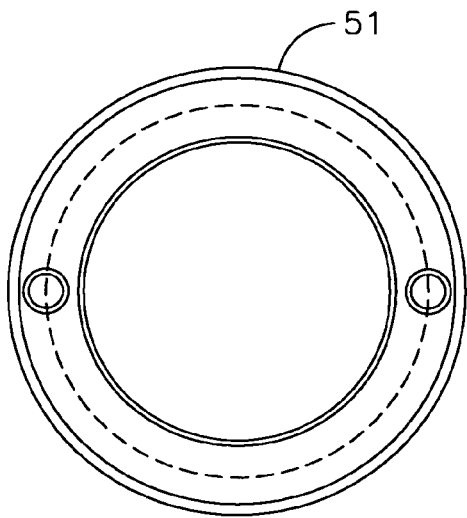

FIGS. 8A and 8B illustrate, respectively, on a larger scale a cross-sectional side view and a bottom view of the support of the perforating filter.

Figure 9A:
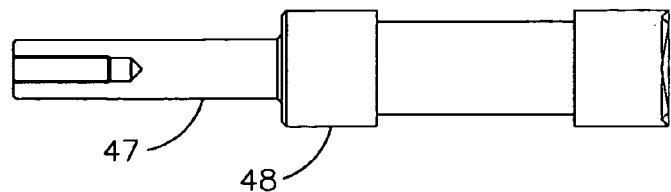
FIGS. 9A and 9B illustrate, respectively, a side view and an end view the perforating tube's piston.
Figure 9B:
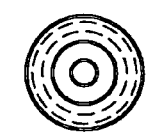

FIGS. 9A and 9B illustrate, respectively, a side view and an end view the perforating tube's piston.

Figure 10A:
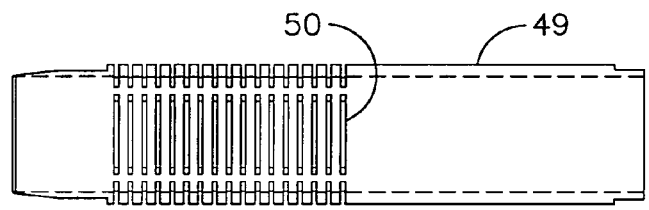
FIGS. 10A and 10B illustrate, respectively, a cross-sectional side view and a transverse cut view of the perforating filtering tube.
Figure 10B:
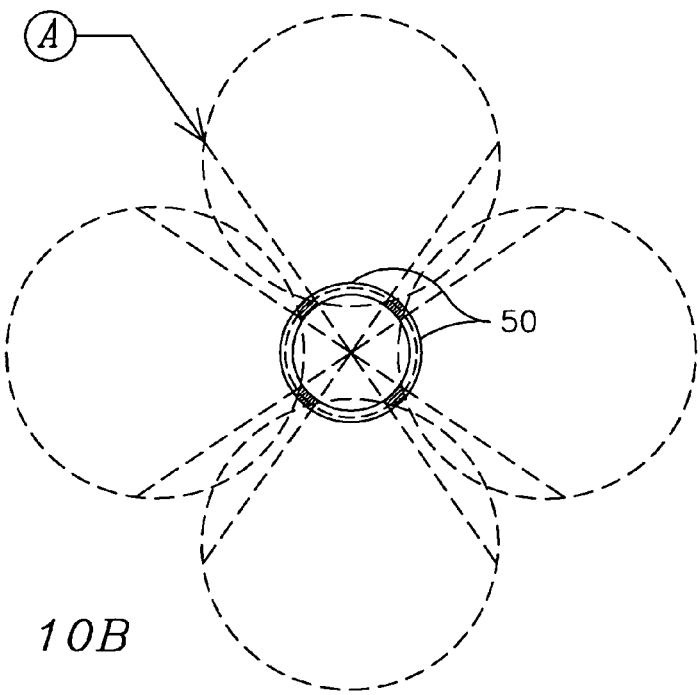

FIGS. 10A and 10B illustrate, respectively, a cross-sectional side view and a transverse cut view of the perforating filtering tube.

Components of the juice extraction machine as depicted in FIGS. 6–10 include two rods (41) passing through the machine's structure (42), and the sliding mobile peeler support (43). Said rods contain pins (44) which condition their return concurrently with the support (43) after the pressing of the fruit.

A base (45) is affixed to the two rods (41) in a manner such that the configuration facilitates the disassembly for cleaning purposes; on this base there is inserted a bolt (46) which mounts the extension (47) to the piston (48) (which need not have a same diameter relief at the center) which works concentric to the perforating tube (49) which in turn is concentric to the fixed peeler, mounted on the machine.

The piston (48) contains a cutting edge which projects itself out of the tube (49) at the end of the opening cycle of the peelers, so that it totally cleans the interior of this tube which contains a plurality transverse slits (50) which have increasing diameters from inside to outside, in a manner to facilitate the self cleaning.

The tube (49) is mounted to a round base (51) threaded to the tubular juice collector (52) which has a flange on which the static peeler is bolted to. Said collector and the peeler form a chamber (53) which collects the juice extracted from the fruit and filtered by the slits (50).

On the posterior position (outside of the machine) the collector (52) has a transverse slit (54) through which the totally filtered juice exits. The refuse materials (seed, core, etc.) pushed by the piston (48) fall inside the machine into a dedicated container.

It is worth noting that the constructive characteristics, allied to the utilization of stainless steel materials do not offer any alterations to the organoleptic characteristics of the fruit juice.

The following provides further description of a perforating filtering tube such as is described above and depicted in FIGS. 6 and 10. The configuration of a perforating filtering tube for the extraction of fruit juice, fabricated in stainless steel material or the like, which may be an accessory utilized on the equipment described in U.S. patent application Ser. No. 08/647,066, filed May 9, 1996 by the same inventor (now U.S. Pat. No. 5,655,441), which per the above is incorporated by reference herein, is designed for the cutting and perforating of fruit and filtering of the juice extracted, such as: lemon; orange; tangerine; pokan; etc., for the extraction of their juice, with greater quality, practicality and hygiene, thanks to the configuration of the device.

The object consists of a tubular part having multiple symmetrical slits, trochoidal and parallel to each other, through which the extracted fruit juice exits, being said part installed on the pressing assembly of the machine.

Said object makes a central cut on the fruit through which the juice exits to be filtered by the aforementioned self cleaning slits, thanks to their configuration.

It is worth noting that the object in question presents singular details in comparison to the state of the technology, encompassing therefore the conditions to achieve the privilege sought.

Figure 11A:
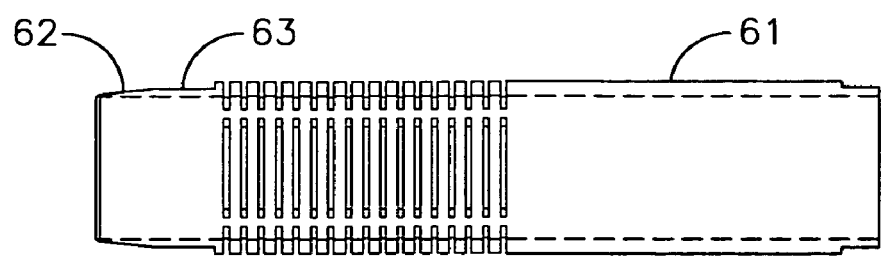
FIGS. 11A and 11B show the tube, as presented also in FIG. 10, in a cross-sectional side view and a transverse cut view, however providing additional component numbering.
Figure 11B:
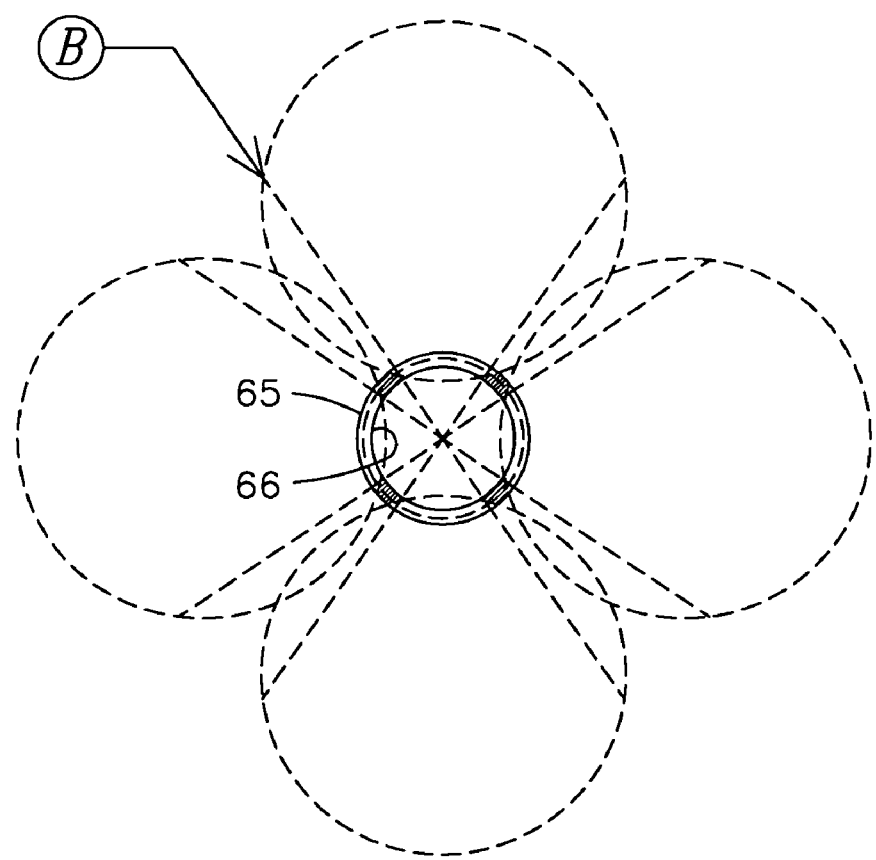

To better comprehend the model, references will be made to the following included drawings, where:

FIG. 11 shows the tube in a cross-sectional view and a side view.

Figure 12:
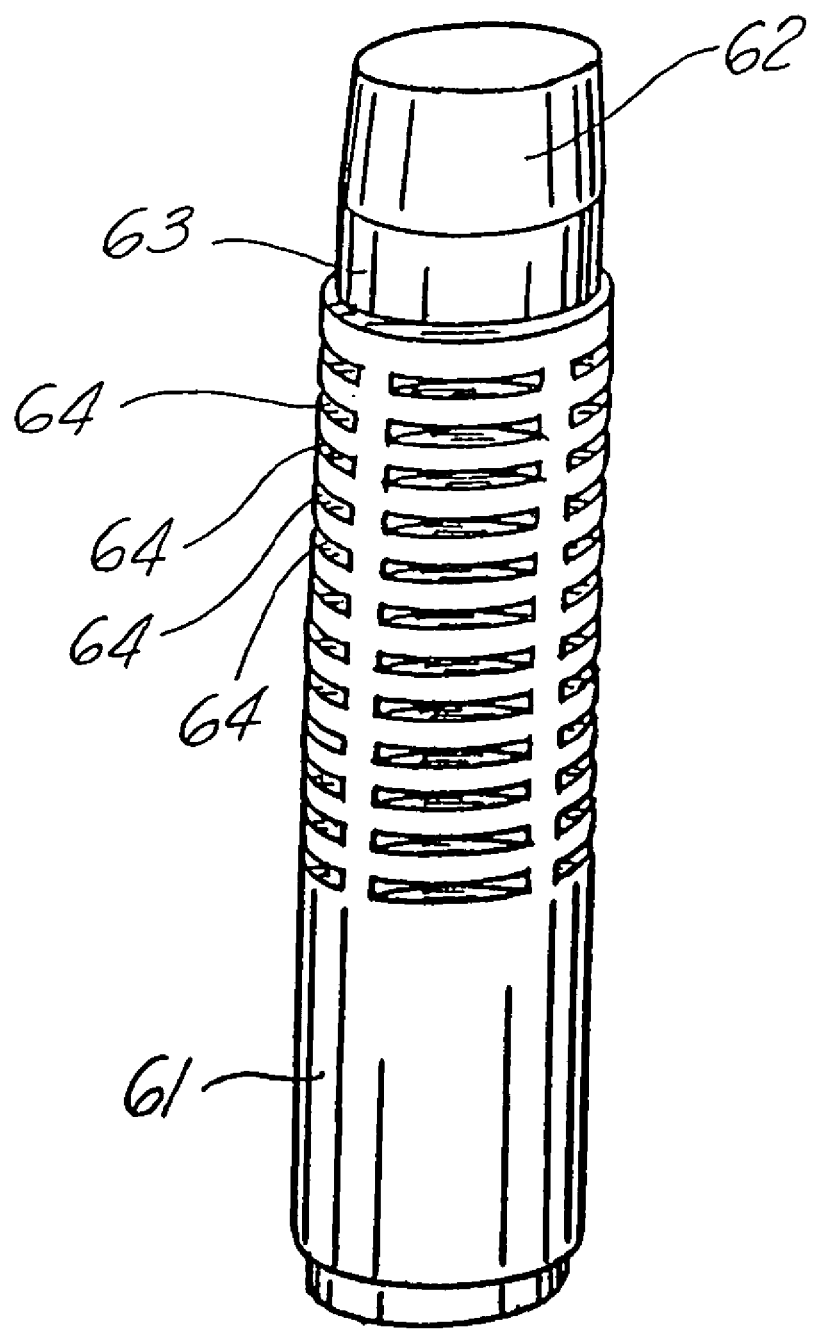
FIG. 12 shows the tube in a perspective view.

FIG. 12 shows the tube perspective.

A perforating filtering tube, as depicted in FIGS. 11 and 12, has a body (61) of stainless steel material or other materials resistant to oxidation and adapted to this purpose, having a circular shape.

Its extremity (62) is sharpened in order to perforate the fruit, followed by a straight portion (63).

The body (61) has a plurality of transverse slits (64), configured strategically through the machining by a circular mill, forming an external diameter (65) which is larger than the internal diameter (66), which in turn impedes the retention of filtered residues.

The following provides further description of a concave and radially cut hemisphere for the cutting and pressing of fruit for the extraction of juice. By reference to the figures and accompanying written disclosure, it may be appreciated that the description of a concave and radially cut hemisphere provides information about the components above that are identified as "fixed peeler" and "mobile peeler." As disclosed in co-pending parent U.S. patent application Ser. No. 09/028,187, filed Feb. 23, 1998, the object, functionally speaking has a slimmer profile, which reduces the complexity of the assembly and its capacity to retain residues, being that, it consists of two parts, symmetrical and with divergent openings with concave cavities turned toward each other, having radially openings that permit the engaging of one part with the other.

It is worth noting that the present object presents singular details in comparison to the state of the technology, incorporating the conditions for achieving the privilege claimed.

Figure 13:
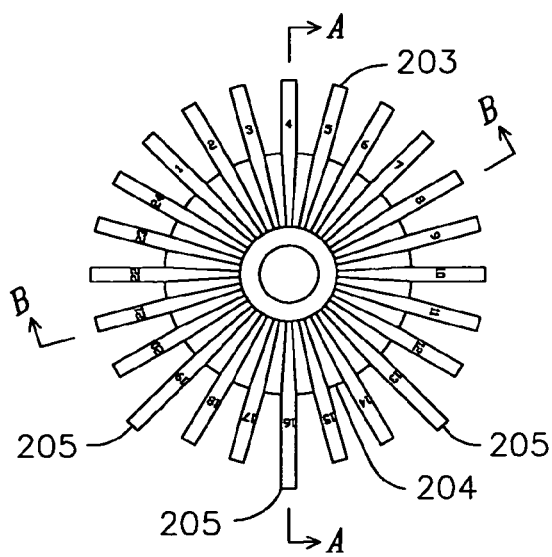
FIG. 13 shows in a plan, the external shape of one of the radially cut and concave hemispheres.

For better comprehension of the model, references will be made to the following included drawings:

FIG. 13 shows in a plan, the external shape of one of the radially cut and concave hemispheres.

Figure 14:
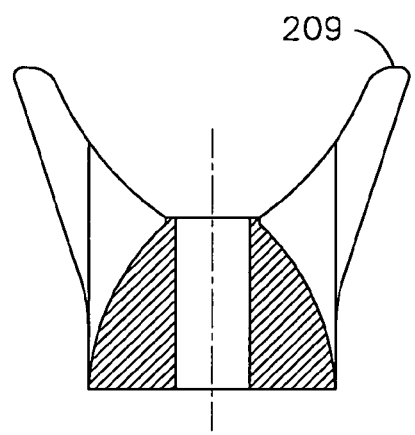
FIG. 14 shows a cross section of the internal part of one of the radially cut and concave hemispheres.

FIG. 14 shows a cross section of the internal part of one of the radially cut and concave hemispheres.

Figure 15:
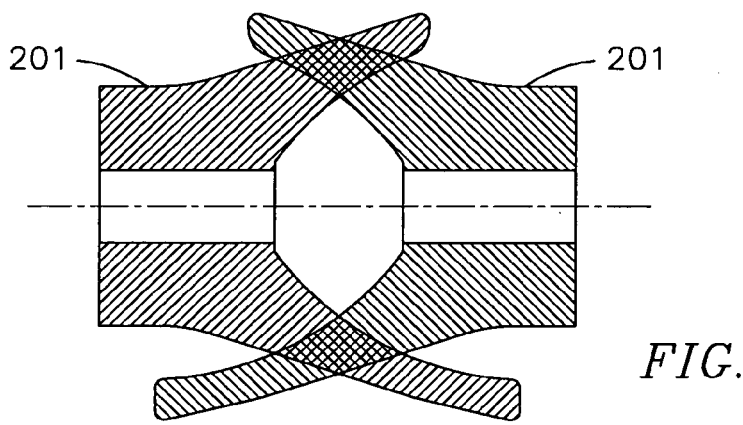
FIG. 15 shows the two radially cut and concave hemispheres in the operating position.

FIG. 15 shows the two radially cut and concave hemispheres in the operating position.

Figure 16:
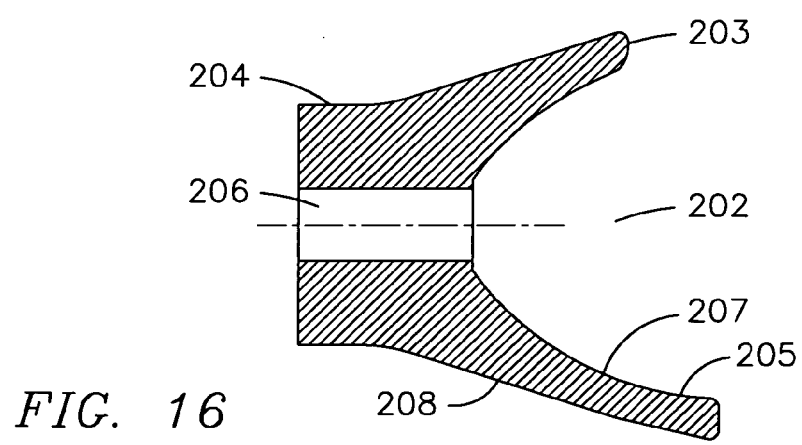
Figure 17:
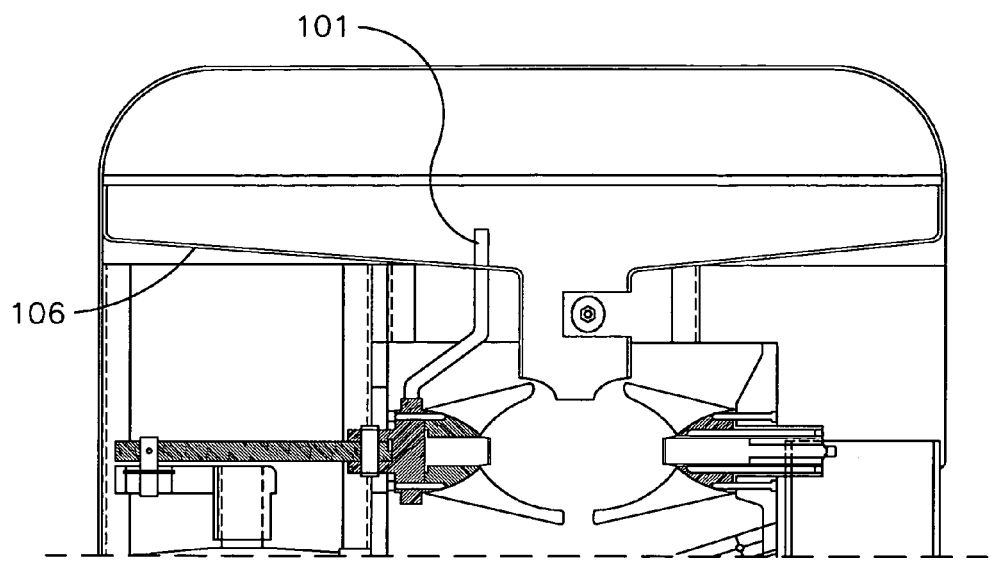
FIG. 17 partially illustrates a side view of the machine, where the agitator/dosing system is noted.
Figure 18:
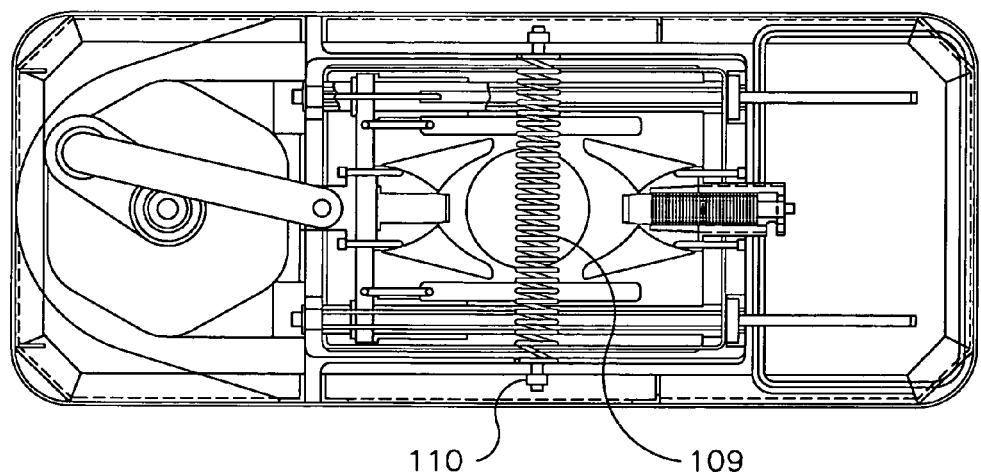
FIG. 18 illustrates a top view of the machine.
Figure 19:
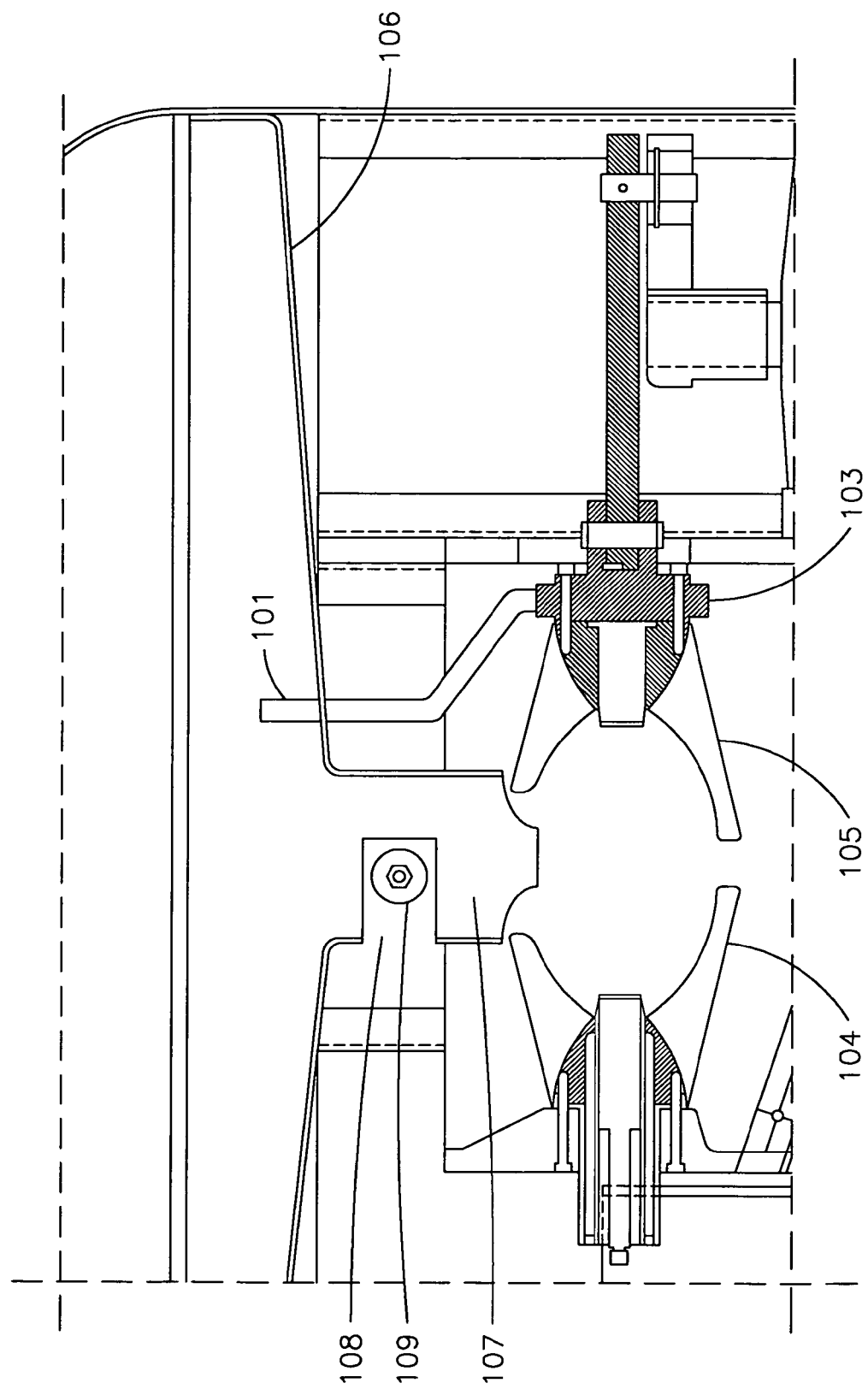
FIG. 19 shows an enlarged detail of FIG. 17.
Figure 20:
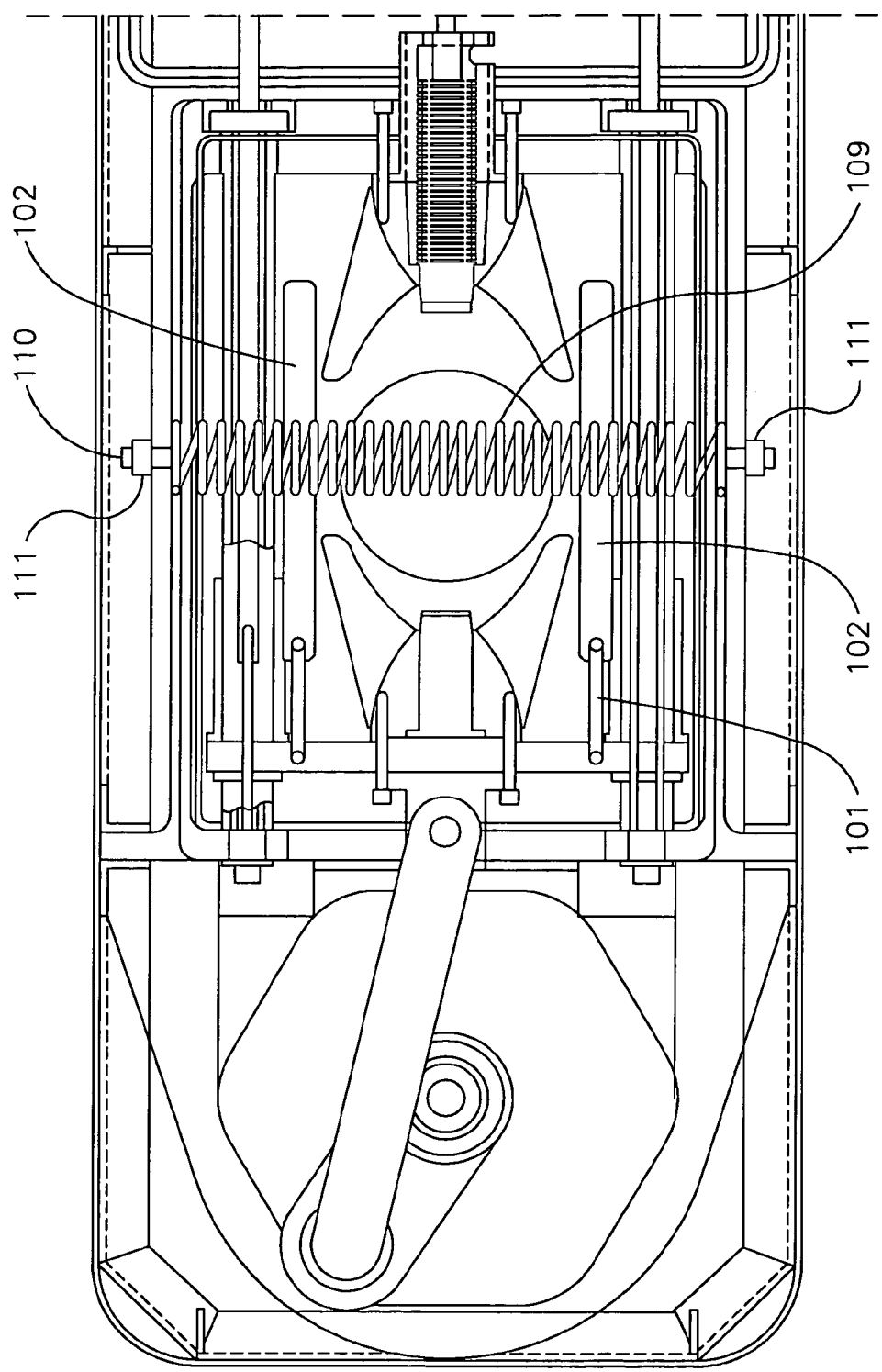
FIG. 20 shows an enlarged detail of FIG. 18.

FIGS. 14 and 16 illustrate cut B—B and a cut A—A of FIG. 13.

The configuration of a concave and radially cut hemisphere for the cutting and pressing of fruit for the extraction of juice consists of a body (201) of metallic or other materials, having a divergent opening.

Internally, the body (201) has a concave shape (202), being said body (201) configured by a multiplicity of radial blades (203) that emerge from a solid block (204). The longer blades (205) mesh with the other blades of normal size, in a manner as to serve as support for the fruit.

Concentrically the body (201) contains a concentric hole (206); the blades (203) have an internal radius (207) smaller than the smallest external radius (208) being its extremities (209), slightly rounded (209).

As is disclosed in U.S. patent application Ser. No. 08/763,769 by the same inventor (now abandoned), which per the above is incorporated by reference herein, an agitator/dosing system embodiment for a citrus fruit juice extraction machine is composed of a fruit agitator made up by two oblique shaped vertical rods (101), whose extremities are positioned parallel to the bottom of the tray (also referred to herein as a fruit bin (106)), piercing through the slots (102) on same (see FIGS. 17–20).

Said rods (101) are fixed to the support (103), on which is mounted the mobile peeler cup (5), opposite of peeler cup (104), being that the movement of these rods is coupled to the movement of the peeler cup system.

The fruit bin (106), situated atop the peeler cups, has a chute (107) perpendicular in order to permit the gravity feeding of the fruit, one by one, into the inside of these peeler cups. Transversely, the chute (107) is equipped with an opening (108), where there is positioned a helical spring (109), at its extremities are bolts (110) which enable the fixing of same to the structure of the machine, with the use of nuts (111).

Said spring (109) is stationed in a position at a secant of the circumference on the chute (107); in so doing, the forward movement of the rods (101) not only agitate the fruit, but also impel the spring to a position outside the opening (108) clearing the chute and thus permitting the passage of a single fruit at a time. Successively, after pressing the fruit, the separation of the peeler cups causes the return of the rods (1), releasing the spring so as to close the passage of fruit.

The agitator/dosing system embodiment for a citrus juice extraction machine is composed of the support (103), on which is mounted the mobile peeler cup (105), positioned below the fruit bin (106), equipped with a chute (107) perpendicular in order to permit the gravity feeding of the fruit, one by one, into the inside of these peeler cups, characterized by the fact that support (103) contains two oblique vertical rods (101), whose extremities are positioned parallel to the bottom of the tray (106), piercing through the slots (102) on the same, being that chute (107) of the bin is equipped with an opening (108), where there is positioned a helical spring (109), at its extremities are bolts (110) which enable the fixing of same to the structure of the machine, with the use of nuts (111).

What is claimed is:

1. A subcombination adapted for use in fruit juice extraction devices comprising, along an axis, a set of opposed intermeshable fixed and mobile peelers, the fixed peeler comprising a plurality of radial blades extending toward the mobile peeler, partially defining a space for a fruit, a perforating filtering tube, comprising a plurality of transverse slits for passage of juice of the fruit, disposed in the fixed peeler so a sharpened extremity of the tube extends a distance into the space for perforating the fruit, the mobile peeler comprising a plurality of radial blades extending toward the fixed peeler, partially defining the space for the fruit, and a piston disposed to move within the perforating filtering tube in order to clean the perforating filtering tube, wherein the opposed intermeshable fixed and mobile peelers further comprise a plurality of blades longer than the respective plurality of radial blades to serve as support for the fruit.

2. The subcombination of claim 1, wherein the axis is horizontal.

3. The subcombination of claim 1, wherein the piston comprises a cutting edge adapted to project itself out of the perforating filtering tube, into the space, at an end of an opening cycle of the intermeshable fixed and mobile peelers.

4. The subcombination of claim 1, wherein each of the plurality of transverse slits comprises an external diameter that is larger than an internal diameter of the respective slit, effective to impede the retention of filtered residues.

5. The subcombination of claim 1, wherein the space for the fruit is concave, and wherein a pressing movement upon the fruit in the space by the mobile peeler is effective to shear a peel of the fruit into multiple slivers during compression of the fruit.

6. The subcombination of claim 1, wherein the piston is adapted to promote internal scraping of the perforating filtering tube, effective to clean the perforating filtering tube.

7. The subcombination of claim 1, wherein the piston does not have the same diameter along its center as at the ends.

8. The subcombination of claim 1, wherein the mobile peeler comprises a concentric central pin.

9. The subcombination of claim 8, wherein the concentric central pin extends for a distance into the space.

10. The subcombination of claim 9, wherein the space for the fruit is concave.

11. A fruit juice extraction device combination comprising the subcombination of claim 1, wherein the fixed peeler and the piston are driven by a motor driving a drive linkage adapted to move the piston through the perforating filtering tube, toward the space, during an opening cycle movement of the mobile peeler away from the fixed peeler.

12. The fruit juice extraction device combination of claim 11, additionally comprising a fruit bin comprising a bottom from which extends a chute equipped with an opening through which a plurality of articles of the fruit may fall, one by one, to enter the space.

13. The fruit juice extraction device combination of claim 12, additionally comprising a helical spring positioned in a transverse opening of the chute at a secant of a circumference of the chute.

14. The fruit juice extraction device combination of claim 13, additionally comprising two vertically oriented rods having their respective top extremities positioned parallel to the bottom of the fruit bin, and piercing through slots in the bottom, the rods further positioned to impel, upon their forward movement, the helical spring to a position outside the transverse opening, thereby permitting a passage of a single fruit.

15. The fruit juice extraction device combination of claim 11, additionally comprising a trigger driven by the mobile peeler for feeding the fruit to the space, wherein the trigger is disposed at a side of the space opposite the longer blades.

16. The fruit juice extraction device combination of claim 15, wherein the axis is horizontal and the longer blades are disposed in a downward direction relative to the space for the fruit.

17. A subcombination adapted for use in fruit juice extraction devices comprising, along an axis, a set of opposed intermeshable fixed and mobile peelers, the fixed peeler comprising a plurality of radial blades extending toward the mobile peeler, partially defining a space for a fruit having a peel, a perforating filtering tube disposed in the fixed peeler, comprising a plurality of transverse slits for passage of juice of the fruit, the mobile peeler comprising a plurality of radial blades extending toward the fixed peeler, partially defining the space for the fruit, and a piston disposed to move through the perforating filtering tube in order to clean the perforating filtering tube, wherein the opposed intermeshable fixed and mobile peelers further comprise a plurality of blades longer than the respective plurality of radial blades to serve as support for the fruit, and wherein as the mobile peeler compresses the fruit against the fixed peeler, the subcombination shears the peel into multiple slivers, thereby impeding the release of oil in the peel into the juice.

18. The subcombination of claim 17, wherein the axis is horizontal.

19. The subcombination of claim 17, wherein the perforating filtering tube comprises an extremity, extending into the space, sharpened to perforate the fruit.

20. The subcombination of claim 17, wherein the piston comprises a cutting edge adapted to project itself out of the perforating filtering tube, into the space, at an end of an opening cycle of the intermeshable fixed and mobile peelers.

21. The subcombination of claim 17, wherein each of the plurality of transverse slits comprises an external diameter that is larger than an internal diameter of the respective slit, effective to impede the retention of filtered residues.

22. The subcombination of claim 17, wherein the space for the fruit is concave.

23. The subcombination of claim 17, wherein the piston is adapted to promote internal scraping of the perforating filtering tube, effective to clean the perforating filtering tube.

24. The subcombination of claim 17, wherein the piston does not have the same diameter along its center as at the ends.

25. The subcombination of claim 17, wherein the mobile peeler comprises a concentric central pin.

26. The subcombination of claim 25, wherein the concentric central pin extends for a distance into the space.

27. The subcombination of claim 25, wherein the perforating filtering tube comprises an extremity, extending into the space, sharpened to perforate the fruit.

28. A fruit juice extraction device combination comprising the subcombination of claim 17, wherein the fixed peeler and the piston are driven by a motor driving a drive linkage adapted to move the piston through the perforating filtering tube, toward the space, during an opening cycle movement of the mobile peeler away from the fixed peeler.

29. The fruit juice extraction device combination of claim 28, additionally comprising a fruit bin comprising a bottom from which extends a chute equipped with an opening through which a plurality of articles of the fruit may fall, one by one, to enter the space.

30. The fruit juice extraction device combination of claim 20, additionally comprising a helical spring positioned in a transverse opening of the chute at a secant of a circumference of the chute.

31. The fruit juice extraction device combination of claim 30, additionally comprising two vertically oriented rods having their respective top extremities positioned parallel to the bottom of the fruit bin, and piercing through slots in the bottom, the rods further positioned to impel, upon their forward movement, the helical spring to a position outside the transverse opening, thereby permitting a passage of a single fruit.

32. The fruit juice extraction device combination of claim 28, additionally comprising a trigger driven by the mobile peeler for feeding the fruit to the space, wherein the trigger is disposed at a side of the space opposite the longer blades.

33. The fruit juice extraction device combination of claim 30, wherein the axis is horizontal and the longer blades are disposed in a downward direction relative to the space for the fruit.

34. A fruit extraction device comprising:
   a frame adapted to support fixed and moving components of the fruit extraction device;
   a fixed peeler comprising a plurality of radial blades extending toward a mobile peeler, partially defining a space for fruit;
   a perforating filtering tube fitting at least in part within the fixed peeler, comprising a plurality of transverse slits for passage of juice of the fruit;
   the mobile peeler, comprising a plurality of radial blades extending toward the fixed peeler, partially defining the space for the fruit;
   a piston disposed to move through the perforating filtering tube in order to clean the perforating filtering tube; and
   at least one drive motor and drive linkage adapted to move the mobile peeler along an axis toward and away from the fixed peeler, and the piston along the axis through the perforating filtering tube, effective to perform sequential juice extraction from sequentially fed fruit positioned in the space,
wherein the opposed intermeshable fixed and mobile peelers further comprise a plurality of blades longer than the respective plurality of radial blades to serve as intermittent support for the fruit in the space.

35. The fruit juice extraction device of claim 34, wherein the axis is horizontal.

36. The fruit juice extraction device of claim 34, wherein the perforating filtering tube comprises an extremity, extending into the space, sharpened to perforate the fruit.

37. The fruit juice extraction device of claim 34, wherein the piston comprises a cutting edge adapted to project itself out of the perforating filtering tube, into the space, at an end of an opening cycle of the intermeshable fixed and mobile peelers.

38. The fruit extraction device of claim 34, wherein each of the plurality of transverse slits comprises an external diameter that is larger than an internal diameter of the respective slit, effective to impede the retention of filtered residues.

39. The fruit juice extraction device of claim 34, wherein a pressing movement upon the respective fruit in the space by the mobile peeler is effective to shear a peel of each respective fruit into multiple slivers during compression of the fruit.

40. The fruit juice extraction device of claim 34, wherein the piston is adapted to promote internal scraping of the perforating filtering tube, effective to clean the perforating filtering tube.

41. The fruit juice extraction device of claim 34, wherein the piston does not have the same diameter along its center as at the ends.

42. The fruit juice extraction device of claim 34, wherein the mobile peeler comprises a concentric central pin.

43. The fruit juice extraction device of claim 42 wherein the concentric central pin extends for a distance into the space.

44. The fruit juice extraction device of claim 34, wherein the space for the fruit is concave.

45. The fruit juice extraction device of claim 43, wherein the perforating filtering tube comprises an extremity, extending into the space, sharpened to perforate the fruit.

46. The fruit juice extraction device of claim 34, additionally comprising a fruit bin comprising a bottom from which extends a chute equipped with an opening through which the sequentially fed fruit may fall, one by one, to enter the space.

47. The fruit juice extraction device of claim 34, additionally comprising a helical spring positioned in a transverse opening of the chute at a secant of a circumference of the chute.

48. The fruit juice extraction device of claim 34, additionally comprising two vertically oriented rods having their respective top extremities positioned parallel to the bottom of the fruit bin, and piercing through slots in the bottom, the rods further positioned to impel, upon their forward movement, the helical spring to a position outside the transverse opening, thereby permitting a passage of a single fruit.

49. A subcombination for fruit juice extraction devices comprising:
   a pair of peelers comprising respective opposed sets of intermeshable blades defining a space for a fruit having a peel, the blades adapted to shear the peel into multiple slivers, thereby impeding the release of oil in the peel into juice of the fruit;
   a filtering tube comprising transverse slits and associated with the pair of peelers, disposed to receive the fruit, compressed by the peelers, and to pass juice of the fruit through the slits; and
   a piston disposed to move within the filtering tube in order to clean the compressed fruit from the filtering tube;
   wherein the pair of peelers further comprise a plurality of blades longer than the respective blades of the opposed sets of intermeshable blades to serve as support for the fruit.

50. The subcombination of claim 49, wherein an axis of relative movement of the pair of peelers is horizontal.

51. A fruit juice extraction device comprising:
   a means for supporting fixed and moving components;
   a means for extracting juice from a fruit supported by the means for supporting fixed and moving components and comprising a filtering tube having a plurality of transverse slits, and a piston disposed to move within the filtering tube; and
   a means for impeding a release of oil from a peel of the fruit into the juice during operation of the means for extracting juice, the means for impeding comprising a pair of peelers comprising respective opposed sets of intermeshable blades supported by the means for supporting fixed and moving components and defining a space for a fruit having a peel, the blades adapted to shear the peel into multiple slivers, thereby impeding the release of oil in the peel into the juice;
   wherein the pair of peelers further comprise a plurality of blades comprising a length longer than blades of the respective opposed intermeshable blades to serve as support for the fruit.

52. The device of claim 51, comprising:
   a means for removing the peel from a core of the fruit while shearing the peel into multiple slivers; and a means for compressing the core to extract the juice without compressing the peel slivers.

53. The device of claim 52, further comprising:

the pair of peelers comprising a set of opposed intermeshable fixed and mobile peelers, each peeler comprising a plurality of radial blades cooperatively associated when driven together to shear the peel and to expel the peel slivers away from the core;

the filtering tube associated with the set of peelers for receiving and compressing the core separated from the peel without receiving or compressing the peel slivers; and a piston operable within the filtering tube for pushing the compressed core from the filtering tube.

* * * * *